Oct. 3, 1967 J. W. RILETT 3,344,666
MASS FLOWMETERS

Filed Dec. 7, 1964 3 Sheets-Sheet 1

INVENTOR
John Walter Rilett
BY
ATTORNEY

Oct. 3, 1967   J. W. RILETT   3,344,666
MASS FLOWMETERS

Filed Dec. 7, 1964   3 Sheets-Sheet 3

INVENTOR
John Walter Rilett
BY
ATTORNEY

United States Patent Office 3,344,666
Patented Oct. 3, 1967

3,344,666
MASS FLOWMETERS
John W. Rilett, London, England, assignor to Elliott Brothers (London) Limited, London, England, a British company
Filed Dec. 7, 1964, Ser. No. 416,552
Claims priority, application Great Britain, Dec. 10, 1963, 48,688/63
10 Claims. (Cl. 73—231)

This invention relates to mass flowmeters.

Mass flowmeters can be used to measure the mass flow of fuel or other liquid passing into, for instance, an engine of an aircraft, but the flowmeters hitherto proposed have been limited in their effective range and have not been sufficiently accurate for many purposes. Furthermore, they have been more costly and have required more maintenance than desirable.

According to the present invention there is provided a mass flowmeter comprising a tube defining a fluid flow path, a first member in said tube rotatable by the flow of fluid therethrough, a second member in said tube resiliently coupled to said first member so that it is rotated by rotation of said first member, the second member being adapted to impart to said fluid an angular velocity substantially equal to that of the second member, and means adapted to measure the angular displacement between, and the angular velocity of, said members for determining the mass flow rate of said fluid.

The invention also provides a mass flowmeter comprising a tube forming a fluid flow path, a fluid-driven first bladed member mounted for rotation in said tube, a fluid-driving second bladed member coaxial with, and rotatable by the rotation of, said first member, said second member being adapted to impart an angular velocity to said fluid substantially equal to that of said second member and being coupled to the first member with a degree of compliance such that it rotates with an angular velocity equal to that of said first member under constant fluid flow but lags behind said first member by an angular displacement dependent on the mass flow, and the angular velocity, of said fluid, and means for measuring the said angular displacement and angular velocity of said members to determine the mass flow rate of fluid.

The invention also provides a method of measuring the mass flow rate of fluid passing through a tube which comprises measuring the time taken for one member to rotate through the angle by which it lags another member, the said one member being a rotor disposed in the fluid flow and operable to rotate the body of liquid flowing past it and the said other member being a turbine disposed on the downstream side of said one member to be rotated by the flow downstream thereof and connected to drive said one member through a resilient coupling.

In order that the present invention can be fully understood one embodiment thereof will now be described by way of example only, with reference to the accompanying drawings in which.

Figure 3:
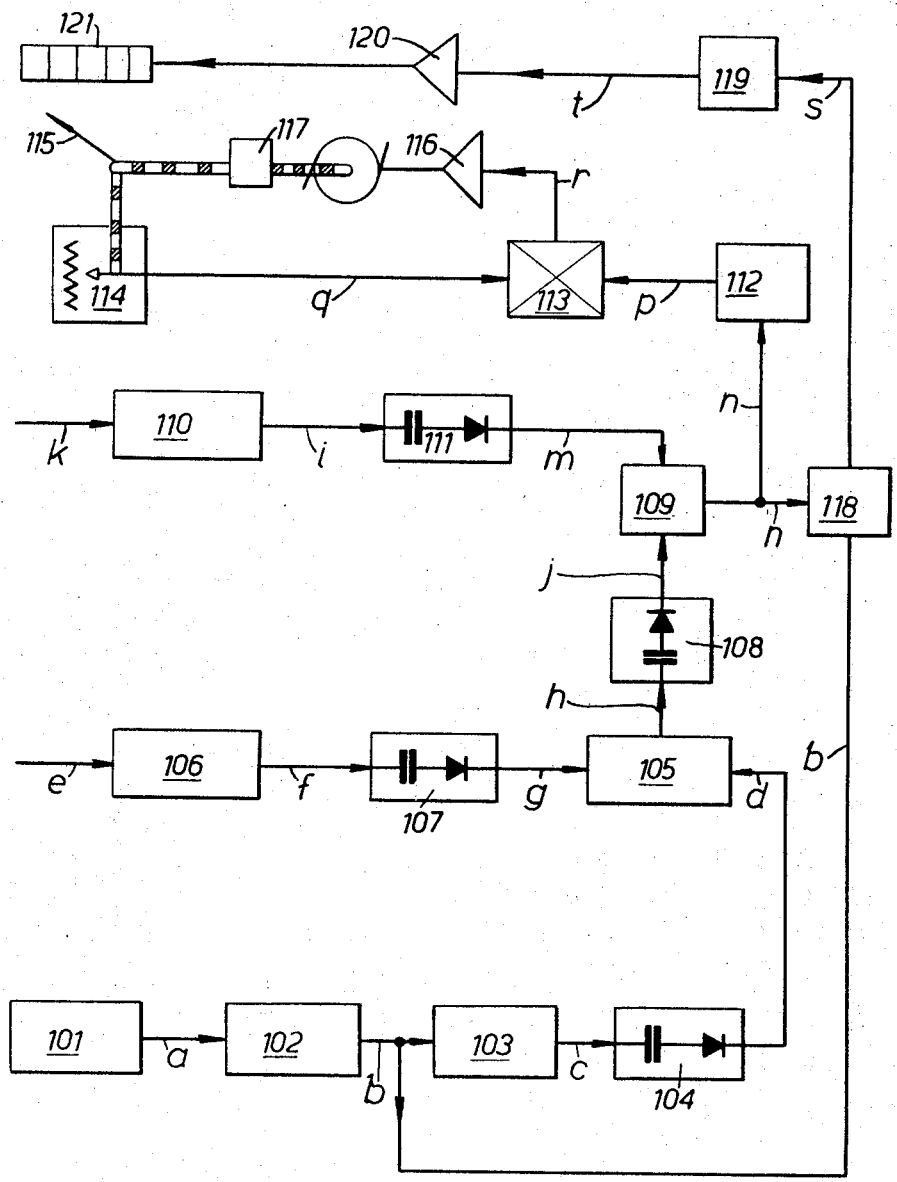
FIGURE 3 is a schematic layout of computation and display apparatus.
Figure 4:
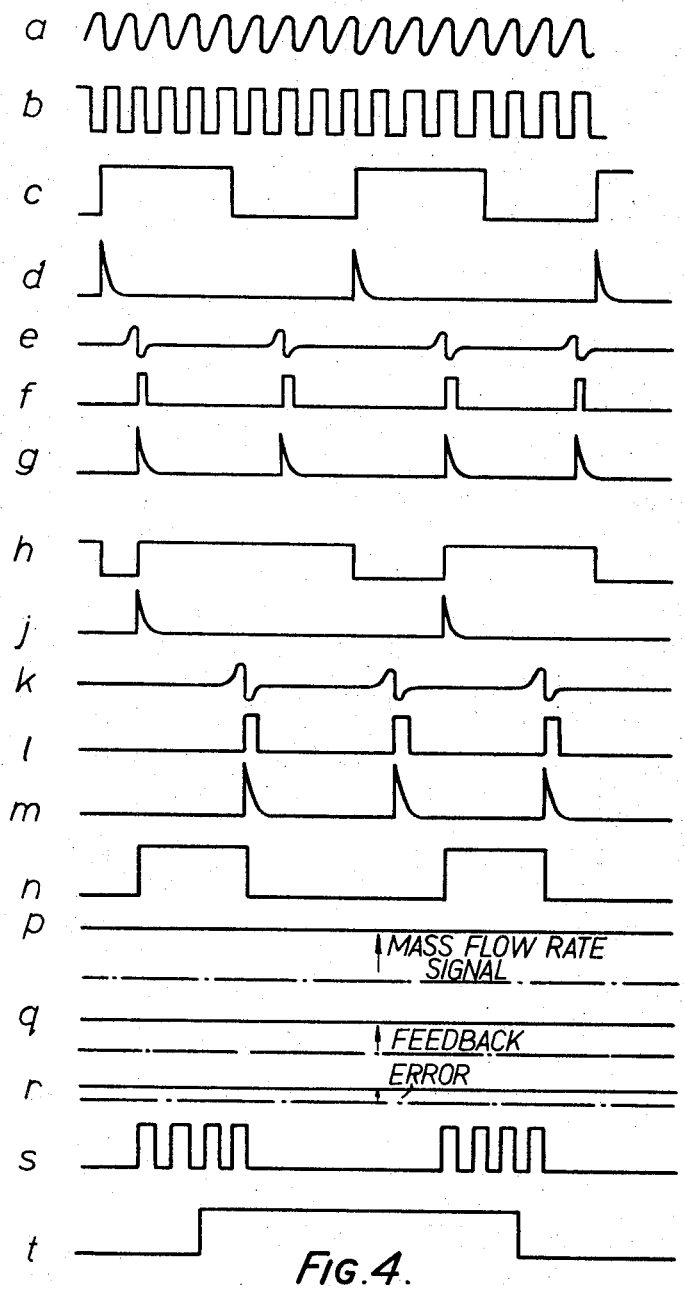

FIGURE 4 indicates diagrammatic waveforms produced by the apparatus of FIGURE 3.

Figure 1:
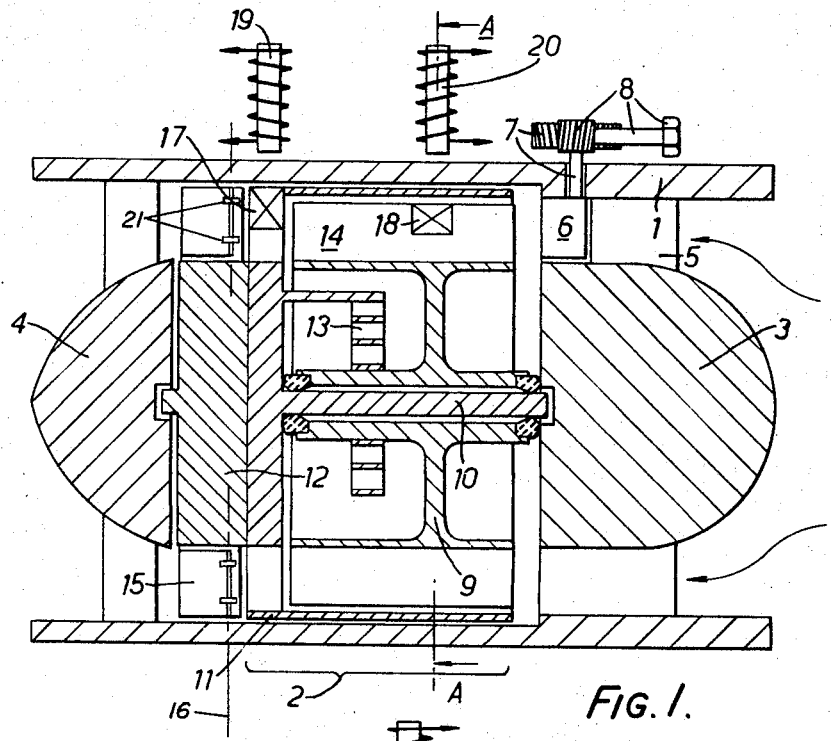
FIGURE 1 is an axial section through the transmitter of a mass flowmeter according to this invention.
Figure 2:
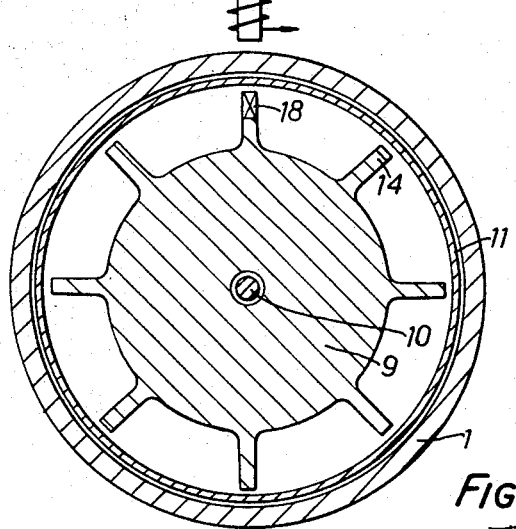
FIGURE 2 is a section on the line A—A of FIGURE 1.

The mass flow is metered by a unit, herein called the transmitter and shown schematically in FIGURES 1 and 2. The transmitter comprises a body 1 in whose cylindrical bore is supported a measurement assembly 2 between an inlet bearing support 3 and an outlet bearing support 4. The inlet bearing support is surrounded by a plurality of radially-disposed guide vanes 5 so that fluid entering the transmitter is directed into the annulus between the support 3 and the body 1 and is constrained therein to flow in an axial direction.

The measurement assembly comprises a turbine-driven rotor 9, hereinafter referred to as the impeller 9, a drum 11 and the impeller-driving turbine 12. The impeller 9 is supported on a shaft 10, being capable of angular displacement thereon. The drum 11 and the turbine 12 are mounted rigidly on the shaft 10.

The impeller is linked to the drum and turbine by a calibration spring 13, and incorporates a plurality of radially disposed vanes 14 lying in planes containing the transmitter center line to impart to the flow in the annulus to the same angular velocity as that of the impeller.

The turbine 12 comprises a plurality of blades 15 arranged in the annular fluid flow downstream of the impeller 9 so as to cause the measurement assembly to rotate, the blades being advantageously pivoted and spring-constrained by springs 21 at their pivot hinge-lines 16 so as to allow variation of pitch according to fluid flow rate.

In operation fluid the mass flow rate of which is to be measured, enters the transmitter by way of the annulus formed by the support 3 and the body 1. The fluid flow in the annulus is constrained by the guide vanes 5 to be in an axial direction. The fluid passes from the annulus through the space formed by the drum 11, impeller 9 and vanes 14, past the blades 15 of the turbine 12 and out from the transmitter past the support 4.

The passage of the fluid past the blades 15 turns the turbine 12 and by way of the spiral spring 13 the impeller 9. Rotation of the impeller 9 imparts to the fluid, by way of the vanes 14, an angular velocity substantially equal to the angular velocity of the rotating impeller 9.

The turbine-supplied impeller-driving torque transmitted by the spring 13 deflects the spring 13 in dependence on the spring's characteristic thereby causing the impeller 9 to lag the turbine 12 by an angular displacement which represents the said transmitted torque. It will be appreciated that in steady state flow conditions the turbine 12 and impeller rotate at the same speed.

The drum 11 driven directly by the turbine 12 ensures, by reducing viscous drag effects on the impeller substantially to zero, that substantially all the torque transmitted by the spring 13 to the impeller 9 is used to impart angular velocity to the fluid.

The pitch of blades 15 of the turbine 12 varies against the spring-constraint in dependence of the mass flow rate and the pitch change acts to reduce the changes in rotational speed of the measurement assembly resulting from changes in mass flow rate as compared with the change which would occur with a fixed blade turbine.

The biasing rudder 6 may be adjusted by the sternpost and gearwheel 7 linked to a wormgear, shaft and adjustment nut 8 to introduce a small amount of either positive or negative biasing swirl, in relation to the direction of the angular velocity imparted to the fluid by the impeller 9, in order that the operating characteristics of the transmitter may be adjusted. Biasing swirl may also be introduced by the guide vanes themselves in some embodiments of the invention.

In essence the turbine 12 is a means of driving the measurement assembly at a speed dependent on the fluid flow rate, with a desired speed versus flow rate characteristic. As such it may take a variety of forms, for example, spring constraint may be applied in varying degrees to chosen numbers of turbine blades, with chosen pitch versus spring constraint characteristics.

Alternatively the turbine blades could be of fixed pitch angle, being preceded by an annulus of inlet guide vanes mounted downstream of the drum and upstream of the turbine. The inlet guide vanes would then be spring constrained in such a way as to give the turbine the desired speed versus flow rate characteristic.

The positioning of the turbine downstream of the impeller is to be preferred; alternatively it could be mounted upstream of the vanes 5 at the inlet to the transmitter or in a variety of alternative configurations.

The drum 11 is driven directly by the turbine and has a skirt that surrounds the impeller. The impeller is rotated from the drum by a resilient coupling, such as calibration spring 13. The impeller vanes are effective to give the fluid flowing through the measurement assembly the same angular velocity as the impeller itself has. The skirt of the drum rotates at substantially the same speed as the impeller and thus there is little frictional energy loss between it and the transmitter body bore, since the angular velocity of the fluid is equal to that of the impeller.

It can be shown that the torque required to accelerate the fluid flow to the angular velocity of the impeller is proportional to mass flow rate multiplied by the angular velocity of the impeller. The function of the transmitter is then to give an output describing mass flow rate in terms relating to torque and angular velocity. This function can be fulfilled by the calibration spring 13 having a linear characteristic whereby the angular displacement of the impeller 9 relative to the drum 11 is proportional to the torque. This displacement is thus proportional to mass flow multiplied by angular velocity (speed).

In giving the desired output of mass flow rate in terms of torque and speed, the transmitter could employ a variety of torque and speed-measuring devices, for instance, a torque motor, a calibration spring linked to a potentiometer or synchro, or a gyroscopic or centrifugal device or other means to measure torque and a velocity pick-off, tachogenerator, frequency pick-off or other means to measure speed. The preferred method is to fit one or more pick-off magnets 17 to the drum 11 and one or more pick-off magnets 18 to the impeller 9 with one or more pick-offs 19, 20, situated advantageously outside the body wall, in line with the drum and impeller pick-off magnets respectively. The passage of the magnets 17, 18 past their respective pick-offs 19, 20, thereby induces primary electrical pulses in the pick-offs.

To facilitate description of the invention the impeller and drum are each shown to have only one magnet and one associated pick-off. These magnets and pick-offs are axially aligned when no torque is sustained by the impeller, although other embodiments may advantageously employ variations to this approach.

Once per revolution, the drum pick-off 19 and the impeller pick-off 20 each generates a primary pulse. When fluid is flowing through the transmitter and the measurement assembly is rotating, a displacement proportional to mass flow multiplied by speed will appear between the drum and impeller pick-off magnets. Thus the drum primary pulse will be followed at a later instant in time by an impeller primary pulse and the time interval between these pulses will be proportional to displacement divided by speed. Thus the time interval is proportional to mass flow rate only.

This time interval then recurs once per revolution, in the form of a drum pulse followed later by an impeller pulse. It will be seen that this cycle is repeated at a repetition frequency proportional to speed or rotation, which, in some embodiments, may vary over the flow rate range.

The computation and display of mass flow rate and/or integrated flow may be accomplished by a variety of means. Various analogue and digital techniques are possible, including synchros, dividing servos, velodyne servos, eddy-current devices, gyro-precession devices, sampling techniques employing time-bases using capacitor-charging or crystal-reference techniques, etc.

A preferred embodiment of computation and display means is now described with reference to FIGURES 3 and 4. A crystal oscillator 101 provides clock pulses (waveform $a$) which are squared by a Schmitt Trigger 102 to produce a waveform $b$ which is fed to a binary divider 103 to give the output waveform $c$. This is differentiated and steered (by which we mean the pulse resulting from the trailing edge is eliminated) by a capacitor and diode unit 104 to give the waveform $d$. This represents a train of regularly-recurring trigger pulses, with a period chosen to be sufficiently great, in random combination with the period between drum and impeller pulses from the transmitter, to allow at least one such transmitter period to start and end in the course of a period between trigger pulses, called the "sampling period." The trigger pulses are fed to one side of a first bistable switch 105.

Drum pulses from the transmitter having a waveform $e$ pass through an amplification and squaring stage 106 to produce a waveform $f$ and are differentiated and steered by a capacitor and diode unit 107 to produce a waveform $g$. This is fed to the other side of the first bistable switch 105. The output from the first bistable switch then has a waveform $h$ which is differentiated and steered by a capacitor and diode unit 108 to result in a waveform $j$. These trigger pulses are fed to one side of a second bistable switch 109.

Impeller pulses from the transmitter having a waveform $k$ are similarly amplified and squared by stage 110 to produce the waveform $l$. Differentiation and steering of the pulses in capacitor and diode unit 111 gives a waveform $m$ and these trigger pulses are fed to the other side of a second bistable switch 109.

The output from the second bistable switch will have the waveform $n$. It will be seen that the square waves in this waveform have a duration proportional to mass flow rate, as their leading edges are defined by drum pulses and their trailing edges by impeller pulses. Furthermore, it will be seen that, in this embodiment, one and only one such square wave is produced in each sampling period.

The resulting square waves, although irregularly spaced between consecutive pairs, are thus regular in the sense that, say, 10 square waves always appear over 10 sampling periods, which might, in one embodiment, represent a time of three seconds. This type of periodicity is adequate for all known applications of mass flowmeters. In conclusion it will be seen that, although transmitter speed may vary, this sampling system produces a mass flow rate signal of a substantially regular nature.

The mass flow rate signal $n$ may, once again, be used by a variety of means and this invention describes only one preferred embodiment, whereby a display of mass flow rate and/or integrated flow may be achieved.

The waveform $n$ can be fed to an R-C network 112 to produce an analogue voltage level $p$ proportional to mass flow rate. This voltage level is compared in a comparator 113 with the voltage level $q$ derived from a feedback potentiometer 114 linked to a pointer 115 displaying mass flow rate on a suitably-graduated scale. The error signal $r$ from the comparator is amplified by an amplifier 116 and used to energise a motor and gear train 117 to drive the pointer to a position when there is no error signal.

In the preferred embodiment the mass flow rate signal $n$ is integrated by using it to control a gate 118 to pass squared clock pulses (waveform $b$) from the crystal oscillator 101 and Schmitt Trigger 102. The resultant output has a waveform $s$ in which each gated clock pulse represents a discrete and known mass of fluid. This waveform is fed to a binary divider 119 to give an output $t$ of one pulse per unit of mass. The divide ratio of the binary divider is chosen to give the desired output units, for example, one pulse equalling one kilogramme of fluid. This pulse output is passed through an amplifier 120 to drive an impulse counter 121 registering, for example, kilogrammes of fluid which have passed through the transmitter. Of course, the impulse counter can be used to indicate the contents of a fluid system, such as a limited capacity fluid system, by adding or subtracting the flow through the transmitter, depending on the direction of flow, from the original contents of the system.

I claim:

1. A mass flowmeter comprising a fluid flow tube, a fluid turbine and an impeller member, means mounting said fluid turbine and said impeller member in said flow tube for rotation about a common axis disposed longitudinally to said tube, said fluid turbine including a rotor having turbine blades disposed at an angle to the direction of fluid flowing through said tube, said impeller member including a rotor having radial vanes substantially parallel to the axis of rotation of said rotor, resilient coupling means interconnecting the turbine rotor with said impeller rotor for driving the impeller rotor from said turbine rotor to impart to said fluid a swirl having an angular velocity substantially equal to the angular velocity of said impeller rotor whereby the impeller rotor due to the resiliency of said coupling means lags behind the turbine rotor by an angle which is a function of the mass flow rate of fluid within the tube, and means for measuring the angle of lag.

2. The mass flowmeter described in claim 1 wherein the impeller member is mounted for rotation upstream of the fluid turbine.

3. The mass flowmeter described in claim 1 wherein means are provided for movably mounting the turbine blades on the turbine rotor including means effective to vary the pitch of said blades in response to variation in the rate of fluid flow through the tube.

4. The mass flowmeter described in claim 2 wherein the turbine rotor carries a cylindrical sleeve member rotatable with the turbine rotor and extending towards the impeller member, said sleeve member surrounding the impeller member and defining therewith an annular fluid flow channel for delivering the swirling fluid discharged from the impeller member directly to the turbine rotor free of contact with the inner wall of the flow tube whereby to eliminate friction between the swirling fluid and the tube wall as the fluid passes through the flowmeter.

5. A mass flowmeter comprising a fluid flow tube, a swirl producing impeller member and a fluid turbine member mounted within the tube for rotation about a common axis with the turbine on the downstream side of the impeller member and positioned to receive and to be driven by the fluid passing through the impeller member, said turbine member having a rotor provided with blades disposed at an angle to the direction of fluid flow through said tube and said impeller member having a rotor provided with radial vanes substantially parallel to the axis of rotation thereof, a resilient drive means interconnecting the impeller member with the fluid turbine to rotate the impeller member and to impart to the fluid passing therethrough a swirl having angular velocity substantially equal to the angular velocity of said impeller, the resiliency of said drive means causing the impeller member to lag behind the fluid turbine by an angle which is a function of the mass flow rate of fluid passing through the turbine, and means for measuring the product of the angle of lag and the time taken by the rotors to turn through a unit angle, thereby to determine the mass flow rate of the fluid.

6. A mass flowmeter comprising a fluid flow tube, an impeller member rotatably mounted in said tube for rotation about a longitudinal axis, said impeller member having radially extending, axially directed vanes for imparting swirl to fluid passing through said impeller when said impeller is rotated, a fluid turbine rotatably mounted in said tube coaxially with the impeller and on the downstream side thereof and positioned to receive the fluid discharged by said impeller and to be driven by said swirling fluid, a hollow cylindrical body secured to said turbine coaxial with, and surrounding said impeller, said hollow body and said impeller defining between them an annular flow path for said fluid, whereby to eliminate frictional contact between the swirling fluid and said flow tube, a resilient drive coupling connecting said impeller and said turbine, the resiliency of the drive coupling causing the impeller to lag behind the turbine, pulse generator means for generating pulses spaced apart by a time interval equal to the quotient of the angle by which the impeller lags the turbine divided by the angular velocity of said impeller and means for measuring the time interval between the pulses whereby to determine the mass flow rate of said fluid.

7. The mass flowmeter described in claim 6 wherein said pulse generator means comprises a first magnetic element mounted on said turbine, a second magnetic element mounted on said impeller, first and second pulse generators mounted on said tube and each co-operating with a separate one of said magnetic elements to emit a pulse as the associated magnetic element passes by it, a circuit for receiving pulses from the first and second pulse generators, said circuit comprising timing means for developing a train of pulses each having a duration equal to the time interval between successive pulses generated by the first and second pulse generators, and means for determining the mass flow rate of said fluid from said time interval.

8. The mass flowmeter described in claim 4 wherein the resilient drive connection between the turbine and the impeller is a spiral spring housed within said cylindrical sleeve, and having its opposite ends connected respectively to the turbine rotor and to the impeller rotor.

9. The mass flowmeter described in claim 2 wherein means are provided upstream of said impeller for directionally biasing the flow of fluid into said impeller for adjusting the operating characteristics of the meter.

10. The mass flowmeter described in claim 9 wherein the means for directionally biasing fluid flow into said impeller includes a pivotally mounted vane extending radially into said tube, and means for adjusting the angle of said vane with respect to the axis of rotation of the impeller.

References Cited

UNITED STATES PATENTS

| | | | |
|---|---|---|---|
| 2,943,487 | 7/1960 | Potter | 73—231 |
| 3,002,384 | 10/1961 | MacDonald et al. | 73—231 |
| 3,043,140 | 7/1962 | Waugh et al. | 73—194 |
| 3,144,769 | 8/1964 | Francisco | 73—231 |
| 3,164,017 | 1/1965 | Karlby et al. | 73—194 |

JAMES J. GILL, *Acting Primary Examiner.*

RICHARD C. QUEISSER, *Examiner.*

EDWARD D. GILHOOLY, *Assistant Examiner.*